United States Patent [19]
Olmsted

[11] 3,936,038
[45] Feb. 3, 1976

[54] MIXER FOR PLASTIC INJECTION MOLDING MACHINE

[75] Inventor: Bernie A. Olmsted, East Longmeadow, Mass.

[73] Assignee: Package Machinery Company, East Longmeadow, Mass.

[22] Filed: Aug. 14, 1974

[21] Appl. No.: 497,336

[52] U.S. Cl. ............................................. 259/191
[51] Int. Cl.² ............................................ B29F 1/04
[58] Field of Search ...... 259/191, 192, 193, DIG. 4, 259/DIG. 10, DIG. 11, DIG. 13, 185

[56] References Cited
UNITED STATES PATENTS

| | | | |
|---|---|---|---|
| 2,669,750 | 2/1954 | Keeney | 259/191 |
| 2,764,781 | 10/1956 | Kelly | 259/185 |
| 3,131,433 | 5/1964 | Volland | 259/191 |
| 3,175,248 | 3/1965 | Swenson | 259/191 |
| 3,319,299 | 5/1967 | Kiraly | 259/191 |
| 3,710,988 | 1/1973 | Moslo | 259/191 |
| 3,826,477 | 7/1974 | Kunogi | 259/191 |

Primary Examiner—Harvey C. Hornsby
Assistant Examiner—Donald B. Massenberg
Attorney, Agent, or Firm—McCormick, Paulding & Huber

[57] ABSTRACT

A rotating feed screw in the barrel of an injection molding machine is fitted with a collar with peripheral grooves through which the plasticized material is fed into a charge forming chamber. The collar is held onto the end of the feed screw by an elongated torpedo body, which body has a first portion for receiving the annular collar, a second portion which defines a plurality of helically oriented crisscrossing grooves in its cylindrical surface, and a third axial portion which defines a raceway for a plurality of spherical roller elements. A nonreturn valve in the form of an annular shuttle is slidably received on the second axial portion, and also slidably received in the bore which rotatably receives the screw, so that the plasticized material is required to pass through the above mentioned grooves and around the ball elements. Thus, the ingredients are mixed in several stages prior to being injected through a nozzle provided in the head of the barrel, into the mold cavity.

11 Claims, 5 Drawing Figures

MIXER FOR PLASTIC INJECTION MOLDING MACHINE

This invention relates generally to injection molding machines, and deals more particularly with that portion of such a machine wherein the charge of plasticized material is formed for injection into the mold cavity.

In a typical injection molding machine the thermoplastic material, usually in the form of pellets, together with any pigment material and softening agent is deposited in a hopper adjacent one end of the elongated barrel. The forward end of the barrel has an adapter or head which defines one end of a chamber into which the molten material is fed by a screw feeder located in the bore of the barrel. The screw is not only rotatable so as to feed material along the bore, but is also reciprocable so that its forward end acts as a piston or ram to force the plasticized material from the chamber through a nozzle in the adapter and thence into a mold cavity.

In order to prevent the pressurized material in this chamber from moving back past the piston end of the feed screw, a monreturn valve in the form of an annular sleeve or shuttle is slidably received in the barrel bore for limited axial movement adjacent the end of the screw. A diffuser or torpedo body is generally provided on the end of the screw, and defines a stop surface for determining the open position of the valve or shuttle. The rear end of the shuttle valve element is adapted to seat against a peripheral portion of the piston or ram, and thereby define the closed position of the valve. Thus, during the forward stroke of the screw thermoplastic material is forced from the chamber through the nozzle. The piston is provided with radially outwardly open circumaxially spaced grooves in its periphery, through which grooves the plastic material is forced during the rotation of the screw. These grooves or ports are closed by the shuttle valve when the material is being injected into the mold under pressure. These ports also serve to mix the plasticized material, an important consideration since such material usually includes not only the basic plastic pellets, but also includes softening agents and pigment material.

The general aim of the present invention is to provide a shuttle valve and torpedo shape which cooperate with one another to define unique flow dividing passageways designed to extend the mixing action beyond the piston or ram portion of the screw in order to increase the mixing action of these materials as they enter the chamber prior to being injected through the nozzle into the mold cavity.

FIG. 1 is a vertical sectional view through the forward end portion of a barrel of the type used in an injection molding machine, and illustrates the screw conveyor at or near its forward limit of travel, and also shows the shuttle valve element in its open position. This would be the position of these components immediately following injection of a charge into the mold cavity (not shown), and as the screw feed starts to rotate in the process of forming a succeeding charge.

Figure 1:
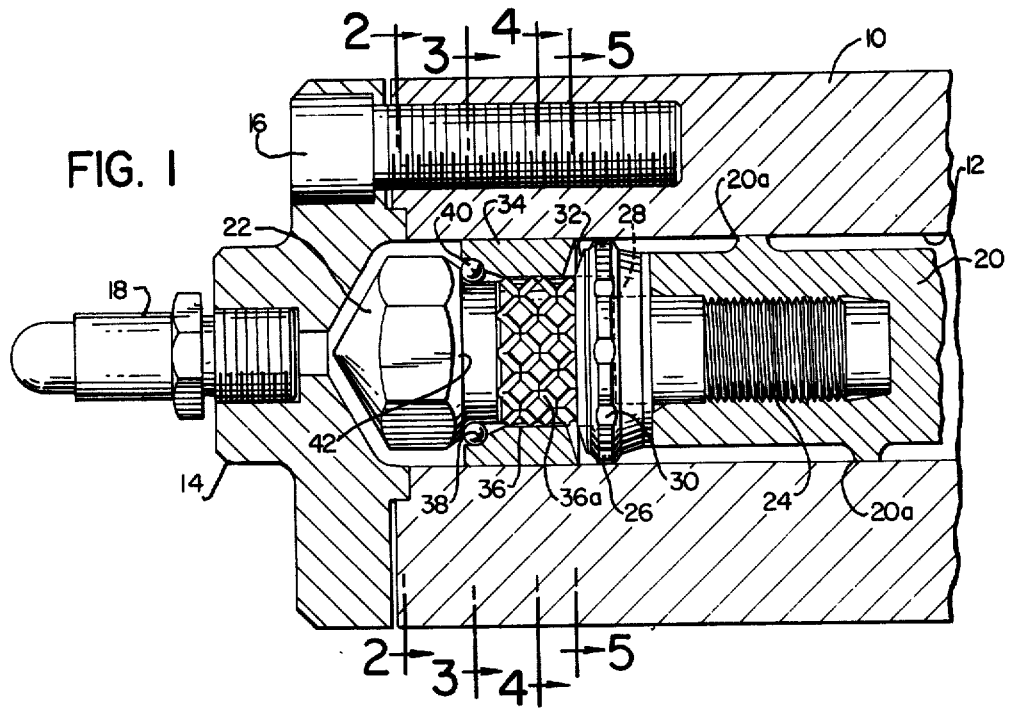
Figure 2:
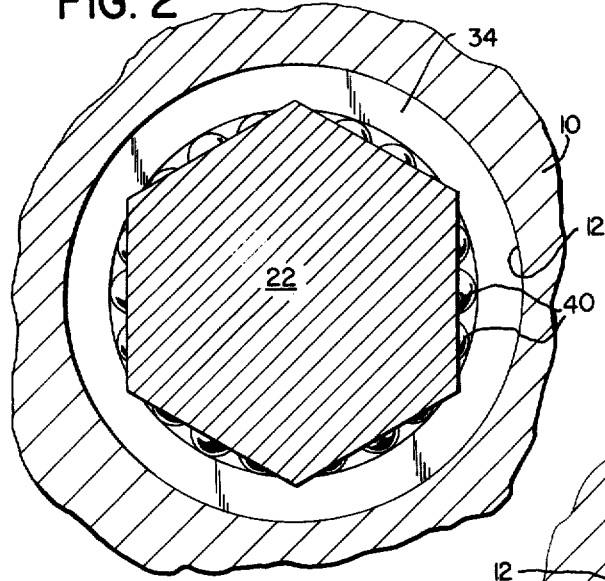
FIG. 2 is a sectional view taken generally on the line 2—2 of FIG. 1.

Referring now to the drawings in greater detail, that portion of an injection molding machine in which the present invention resides is shown in FIG. 1 as comprising a fixed barrel 10 in which is defined a cylindrically shaped bore 12. Only the forward end of the barrel 10 is shown, and an adapter or head 14 is provided on this end of the barrel 10 by circumaxially spaced screws 16 (one shown). A conventional nozzle 18 is provided in the adapter 14, and said nozzle communicates with the mold cavity defining portion of a plastic injection molding machine (not shown) in a conventional manner.

Still with reference to the environment for the present invention, a typical injection molding machine usually includes a hopper adjacent the rear end of the barrel 10 (not shown) by means of which the material to be plasticized is inserted in the bore 12 so as to be fed in the forward direction (toward the left in FIG. 1) by a rotating screw 20. As mentioned previously, this material is usually provided in the form of pellets, and may also include pigment material for providing a product of predetermined color, and also may include softening agents for the purpose of facilitating the plasticizing of the thermoplastic pellets. Heaters are generally provided in or around the barrel 10, and it is also known to provide heaters in the screw 20. However, these details of construction are not specifically shown in the drawings since they involve conventional techniques in the fabrication of injection molding machines.

The screw 20 is rotatably mounted in the bore 12, and is adapted to be driven so as to feed the material longitudinally along the bore 12 and more particularly along the flute or flutes defined between the threads 20a in the screw 20. This screw 20 is also reciprocable, and is adapted to being driven at least in the forward direction and to be returned from the position shown in a rearward direction primarily in response to the pressure generated by the plasticized material being fed into the chamber defined between the adapter head 14 and the nose 22 defined on an elongated torpedo body carried in the forward end of the screw 20. This pressure is generated by the rotating screw 20 as it feeds this material into the chamber along tortuous paths to be described more fully hereinafter. When the plasticized material has been fed into the chamber provided for this purpose in the bore 12, and when the screw 20 has retracted or moved in the rearward direction by a predetermined amount, the screw 20 is rammed forwardly so as to force the plasticized material through the nozzle 18 and thence into the mold cavity or cavities of the machine (not shown).

The present invention relates to the construction for the torpedo body (22–24) and particularly to the cooperation between the improved torpedo body and the nonreturn valve 34 which closes as the screw 20 is advanced in order to prevent the plasticized material in the above mentioned chamber from feeding back along the screw 20. The closed valve 34 assures that the plasticized material is fed forwardly through the nozzle 18 as the screw 20 is rammed forwardly.

Still with reference to FIG. 1, the torpedo body includes a threaded rear end portion 24 which is received in a tapped opening at the forward end of the screw 20. Preferably, the torpedo body is fabricated in two parts, an annular piston or collar part 26 being provided on the stepped portion of the torpedo body indicated generally at 28. This collar 26 has an outer diameter slightly smaller than that of the bore 12. A plurality of circumaxially spaced grooves or ports 30, 30 are provided in the periphery of the collar 26 for passing the plasticized material during rotational movement of the screw 20. The diameter of the collar may be significantly less than that of the bore when very viscous plastic material is being handled. The collar or annular piston 26 may be provided integrally with the screw 20, or may comprise a separate part associated with the torpedo body as shown in FIG. 1, but preferably said collar 26 defines a forwardly facing inclined valve seat 32 of annular configuration which seat 32 is adapted to mate with a rearwardly facing complementary surface on the rear end of the shuttle valve element 34.

This valve element 34 is of annular configuration, and has an inside cylindrical surface which is of at least approximately of the same diameter as that of the medial, or second portion of the torpedo body, as indicated generally at 36 in FIG. 1. This second or medial axial portion of the torpedo body defines crisscrossing, generally helically oriented grooves 36a, which grooves cooperate with the interior cylindrical surface of the shuttle valve element 34 to define a tortuous path for the plasticized material passing through the grooves 30, 30 described above and the opening between the rear face of the shuttle valve 34, and the seat 32 on the collar 26. More particularly, all of this plasticized material must of necessity pass through these grooves in order to reach the charge forming chamber described previously for accumulating the charge of plastic material for injection into the mold. Thus, the mixing of these materials is achieved not only at the periphery of the collar portion of the screw 20, but is also achieved in the crisscrossing passageways 36a defined by the medial or second axial portion 36 of the torpedo body. The plastic material must flow through these grooves, rather than through an annular opening as in most prior art configurations, with the result that the streams of material in these grooves is continuously divided and recombined in this portion of the device to provide a very efficient mixing action. Preferably, two series of helically shaped grooves 36a are provided, each series being opposite in hand to the other, and the pitch of these helices is such that the grooves in the opposite hand series cross each other to form a grid network of open end grooves in the second or medial portion of the torpedo body.

Figure 3:
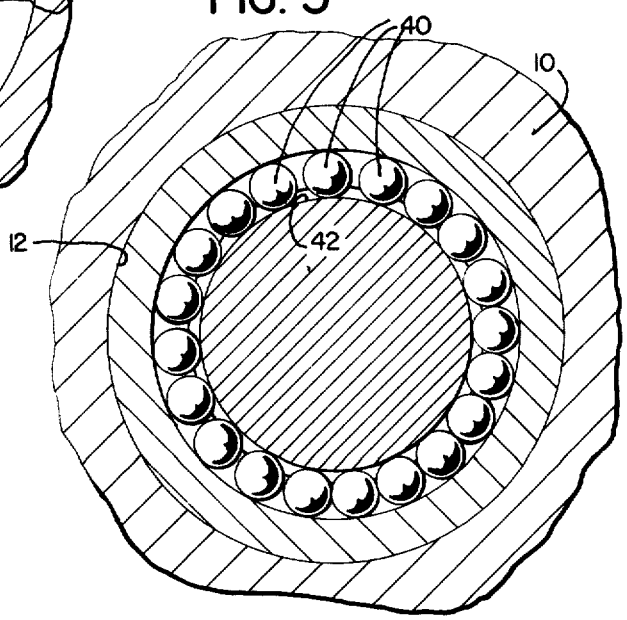
FIG. 3 is a sectional view taken generally on the line 3—3 of FIG. 1.
Figure 4:
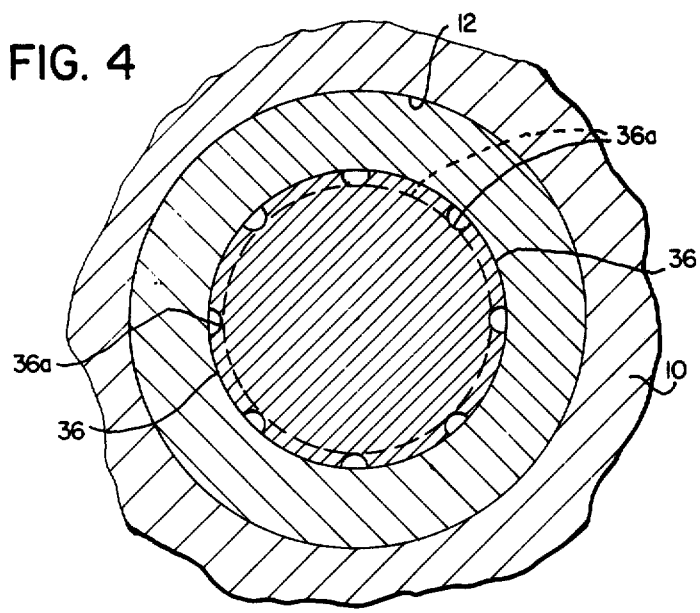
FIG. 4 is a sectional view taken generally on the line 4—4 of FIG. 1.
Figure 5:
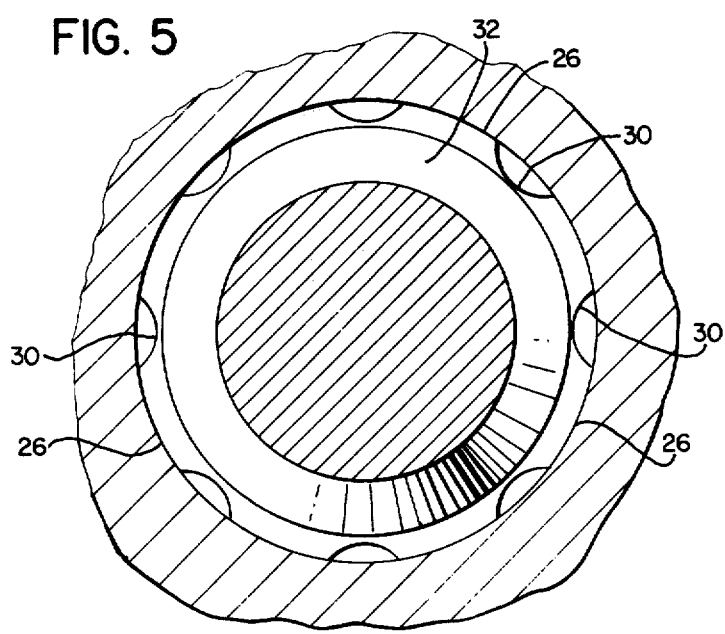
FIG. 5 is a sectional view taken generally on the line 5—5 of FIG. 1.

The generally annular valve element 34 also includes a generally forwardly facing annular surface or raceway 38 which in FIG. 1 is shown in engagement with the roller elements or balls 40, 40. These balls 40, 40 best shown in FIG. 3 are loosely received in the space provided between such forwardly facing surface 38 of the valve element and a complementary shaped surface defined on a shoulder 42 of the torpedo body. This shoulder 42, also shown in FIG. 3, entraps the roller elements 40, 40 in the space provided between it and the surface 38 of the shuttle valve element 34, and permits limited axial movement of the valve element 34 with respect to the torpedo body in order that it may engage and disengage the seat 32. Thus, the ball elements 40, 40 in conjunction with the shoulder defined surface 42, provide a rearwardly facing stop for the valve shuttle 34, to define its open position.

The valve element 34 is slidably received in the bore 12, its motion being limited both forwardly and rearwardly as described above. In addition, however, the device disclosed is so constructed and arranged that the balls 40, 40 comprise flow dividing or flow splitting elements which serve to further mix the material as it enters the chamber defined between the inside of the adapter head 14 and the nose 22 of the torpedo body. From FIG. 3 it will be apparent that the circumaxially spaced balls 40, 40 define a plurality of circumaxially spaced passageways therebetween, and that the plasticized material flowing through this portion of the device is continuously divided and recombined to provide a further mixing stage to assure that the ingredients are very thoroughly mixed prior to arrival in the charge-forming chamber defined between the adapter 14 and the torpedo nose 22. The nose itself may have a nut defining series of flats to facilitate assembly with the screw 20, and a diffuser defining frusto conical nose as shown at 22.

The flow splitting elements 40, 40 are preferably balls, although other element shapes might be utilized to achieve this flow splitting function. The use of roller type elements such as the balls 40, 40 has the further advantage of allowing the torpedo body to freely rotate the inner annular valve shuttle 34 during the charge forming phase when the screw rotates and then retracts.

By way of summary, the charge of plasticized material is fed into the chamber by the rotating screw 20, which screw is moved rearwardly by an amount dictated by the size of the desired charge. As the material is fed between the screw thread 20a, and then through the grooves 30, 30 in the collar or piston 26, some mixing of the several ingredients will occur. However, further mixing will be achieved as a result of the material having to follow the generally helically oriented crisscrossing grooves 36a, 36a defined in the torpedo body 36. The sleeve or shuttle valve element 34 has an inner diameter approximately equal to that of the medial or second axial portion 36 of such torpedo body to close these grooves and form tortuous passageways for mixing the plasticized material. Further mixing will occur as this material passes between the balls 40, 40 with the result that when this material reaches the chamber defined between the nose 22 of the torpedo body and the adapter 14 it will have been rendered substantially homogeneous. The achievement of such homogeneity is an especially important consideration when pigments are provided with the pellets in the hopper to provide an injection molded product of predetermined color. When the desired volume of charge has been formed in the chamber at the forward end of the barrel 10, the rotating screw 20 is rammed forwardly, under pressure, with the result that the charge itself is pressurized and the valve element 14 is moved rearwardly with respect to the torpedo body thereby seating against the annular seat 32 closing the valve opening. Further forward movement of the screw 20 forces the charge out of the chamber and through the nozzle 18 into the runners (not shown) or directly into the mold cavity.

I claim:

1. A device for mixing the plasticized ingredients in a plastic injection molding machine, said device comprising a barrel with an elongated bore, a head for the forward end of said barrel and adapted to receive a nozzle, a screw conveyor slidably and rotatably mounted in said bore, a torpedo body carried at the forward end of said screw conveyor and having a first axial portion defining a collar which has a forwardly facing annular surface, a second axial portion of said torpedo body adjacent said first axial portion and located forwardly thereof, said second axial portion having a cylindrical external surface, an annular valve element slidably received in said bore and having a generally rearwardly facing annular valve surface, engageable with said annular forwardly facing surface to define a valve closed position, said internal cylindrical surface of said valve element providing a sliding fit with said cylindrical external surface of said second axial portion at least one of said cylindrical surfaces defining two series of criss-crossing generally helically configured grooves opposite in hand and providing a pattern of intersecting passageways in cooperation with the adjacent other cylindrical surface for dividing and recombining the flow of plasticized ingredients through said second axial portion, and means carried by said torpedo body for defining a stop for said valve element to define a valve open position.

2. A device according to claim 1 wherein said intersecting grooves are defined on said second axial portion of said torpedo body, said internal cylindrical surface of said valve element comprising a surface of revolution having an axial extent at least approximately equal to that of said groove defining second axial portion of said torpedo body.

3. A device according to claim 1 wherein said means for defining said stop for said valve element comprises a generally rearwardly facing annular shoulder on a third axial portion of said torpedo body, said valve element having a generally forwardly facing annular surface corresponding with said rearwardly facing shoulder to define a generally annular space therebetween, and said means further including flow dividing elements entrained in said annular space for mixing the flow of ingredients passing therethrough.

4. A device according to claim 3 wherein said forwardly facing annular surface of said valve element and said rearwardly facing shoulder on said third axial body portion each define angularly related raceways, and wherein said flow dividing elements comprise circumaxially spaced roller elements which define circumaxially spaced openings therebetween for dividing and recombining the flow or plasticized ingredients.

5. A device for mixing the plasticized ingredients in a plastic injection molding machine, said device comprising a barrel with an elongated bore, a head for the forward end of said barrel and adapted to receive a nozzle, a screw conveyor slidably and rotatably mounted in said bore, a torpedo body carried at the forward end of said screw conveyor and having a first axial portion defining a collar which has a forwardly facing annular surface, an annular valve element slidably received in said bore and having a generally rearwardly facing annular valve surface, engageable with said annular forwardly facing surface to define a valve closed position, a medial portion of said torpedo body cooperating with the internal surface of said valve element to define a path for the plasticized ingredients, and a third axial portion of said torpedo body having a shoulder which defines a generally rearwardly facing annular surface, said valve element having a generally forwardly facing annular surface spaced from said shoulder defined surface, and flow dividing elements loosely received in said annular space to provide circumaxially spaced openings therebetween for dividing and recombining the flow of plasticized ingredients, and said elements also providing a stop for said valve element in its open position.

6. A device according to claim 5 wherein said annular space defining surfaces are raceways for said flow dividing elements, said elements comprising roller elements.

7. A device according to claim 6 wherein said medial portion of said torpedo body has a generally cylindrical external surface of approximately the same diameter as that of said valve element internal surface, at least one of said last mentioned surfaces defining a pattern of intersecting grooves which cooperate with the adjacent other surface to provide passageways for dividing and recombining the flow of plasticized ingredients.

8. A device according to claim 7 wherein said grooves are defined on said second axial portion of said torpedo body, said internal cylindrical surface of said valve element comprising a surface of revolution having an axial extent at least approximately equal to that of said groove defining second axial portion of said torpedo body.

9. A device according to claim 8 wherein said pattern of intersecting grooves comprises at least two series of generally helical grooves opposite in hand, which crisscross one another along the axial extent of said second body portion.

10. A device according to claim 1 wherein said collar has radially outwardly open parts through which the ingredients pass when said valve is open whereby a preliminary mixing is achieved.

11. A device according to claim 5 wherein said collar has radially outwardly open parts through which the ingredients pass when said valve is open whereby a preliminary mixing is achieved.

* * * * *